United States Patent [19]

Fahr

[11] Patent Number: 5,349,751
[45] Date of Patent: Sep. 27, 1994

[54] PIPE CUTOFF APPARATUS

[75] Inventor: Markus Fahr, Gottmadingen, Fed. Rep. of Germany

[73] Assignee: Georg Fischer Rohrleitungssysteme AG, Schaffhausen, Switzerland

[21] Appl. No.: 62,682

[22] Filed: May 17, 1993

Related U.S. Application Data

[63] Continuation of Ser. No. 882,604, May 13, 1992, abandoned.

[30] Foreign Application Priority Data

May 17, 1991 [CH] Switzerland ............... 01487/91-7

[51] Int. Cl.5 ............... B26B 27/00; B26D 3/16; B23D 21/06
[52] U.S. Cl. ............... 30/102; 30/101; 30/108
[58] Field of Search ............... 30/90, 90.2, 95, 97, 30/94, 99, 101, 102, 108

[56] References Cited

U.S. PATENT DOCUMENTS

| | | | |
|---|---|---|---|
| 1,932,462 | 10/1933 | Howlett | 30/102 |
| 2,753,744 | 7/1956 | Therien | 30/97 |
| 2,842,238 | 7/1958 | Shaw et al. | 30/101 |
| 3,807,047 | 4/1974 | Sherer et al. | 30/101 |
| 3,942,248 | 3/1976 | Sherer et al. | 30/108 |
| 4,078,304 | 3/1978 | Netzel | 30/101 |
| 4,402,136 | 9/1983 | Rast | 30/101 |
| 4,531,288 | 7/1985 | Aubriot | 30/101 |
| 4,769,911 | 9/1988 | Araki | 30/97 |
| 4,777,723 | 10/1988 | Southoff | 30/101 |
| 5,081,768 | 1/1992 | Brennan et al. | 30/101 |

Primary Examiner—Richard K. Seidel
Assistant Examiner—Paul M. Heyrana, Sr.
Attorney, Agent, or Firm—Anderson Kill Olick & Oshinsky

[57] ABSTRACT

A pipe cutoff apparatus comprises a frame having two frame parts, which are clamped together, wherein said apparatus comprises guides for a cutter device movable around the pipe to be cut. A pipe clamping device with clamping jaws is arranged at one frame part and clamps the pipe in a centered position with respect to the frame.

10 Claims, 4 Drawing Sheets

PIPE CUTOFF APPARATUS

This is a continuation of application Ser. No. 07/882,604, filed May 13, 1992, now abandoned.

FIELD OF THE INVENTION

The present invention is directed generally to a pipe cutting apparatus and more particularly to a pipe cutting apparatus comprising frame parts which circumscribe the pipe to be cut during the cutting operation.

BACKGROUND OF THE INVENTION

The publication DE-U1-85 26 364.8 describes a pipe cutoff apparatus which has a pipe clamping device comprising four clamping jaws which can be pressed against the pipe, wherein two of the four jaws are arranged at each frame part. Such construction, however, renders it difficult to clamp the pipe centrally with respect to the revolving cutter tool bit and lengthens the clamping process because the four screws or bolts must be consecutively actuated. In order to better align the cutter device with respect to the pipe, the device comprises a second two-part frame with a guide for the cutter tool bit, which is adjustably fastened to the first frame by adjusting screws. Such construction requires additionally a long setup time and is cumbersome and expensive.

To overcome these and other drawbacks of the prior pipe cutting apparatus, it is an object of the present invention to provide a simple construction pipe cutoff apparatus which permits a rapid clamping of the pipe centrally with respect to a revolving tool bit.

Another object of the invention is to provide a pipe cutting apparatus which is easy to transport, portable and usable "on site" where the pipe is actually being laid or secured.

SUMMARY OF THE INVENTION

These and other aspects of the invention which will become hereafter apparent are achieved by the present pipe cutoff apparatus generally comprising a pipe clamping device having simultaneously displaceable clamping jaws, holding in place the pipe to be cut, wherein the clamping device and cutting tool are within a frame of the overall apparatus. The frame comprises guides for the cutting tool and is moveable around the pipe to be cut. This assures simple handling of the pipe cutoff apparatus at, for instance, pipelines which have already been laid in trenches, thereby functioning as a portable tool or as a stationary tool.

BRIEF DESCRIPTION OF THE DRAWINGS

The invention will be better understood by the Detailed Description of The Preferred Embodiment in connection with the following drawings of which.

DETAILED DESCRIPTION OF THE PREFERRED EMBODIMENT

Figure 1:
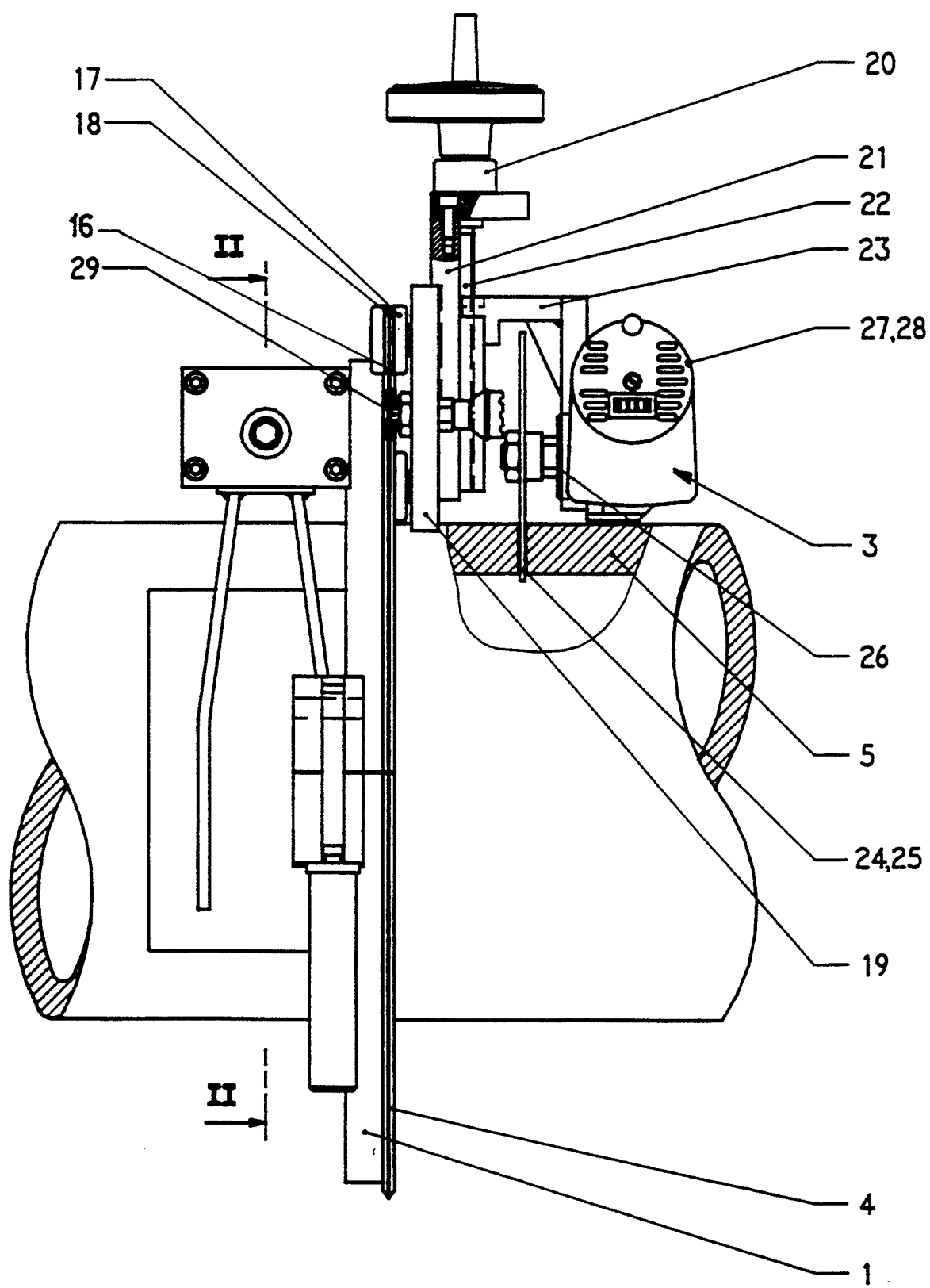
FIG. 1 is a side view of the pipe cutoff apparatus invention.
Figure 2:
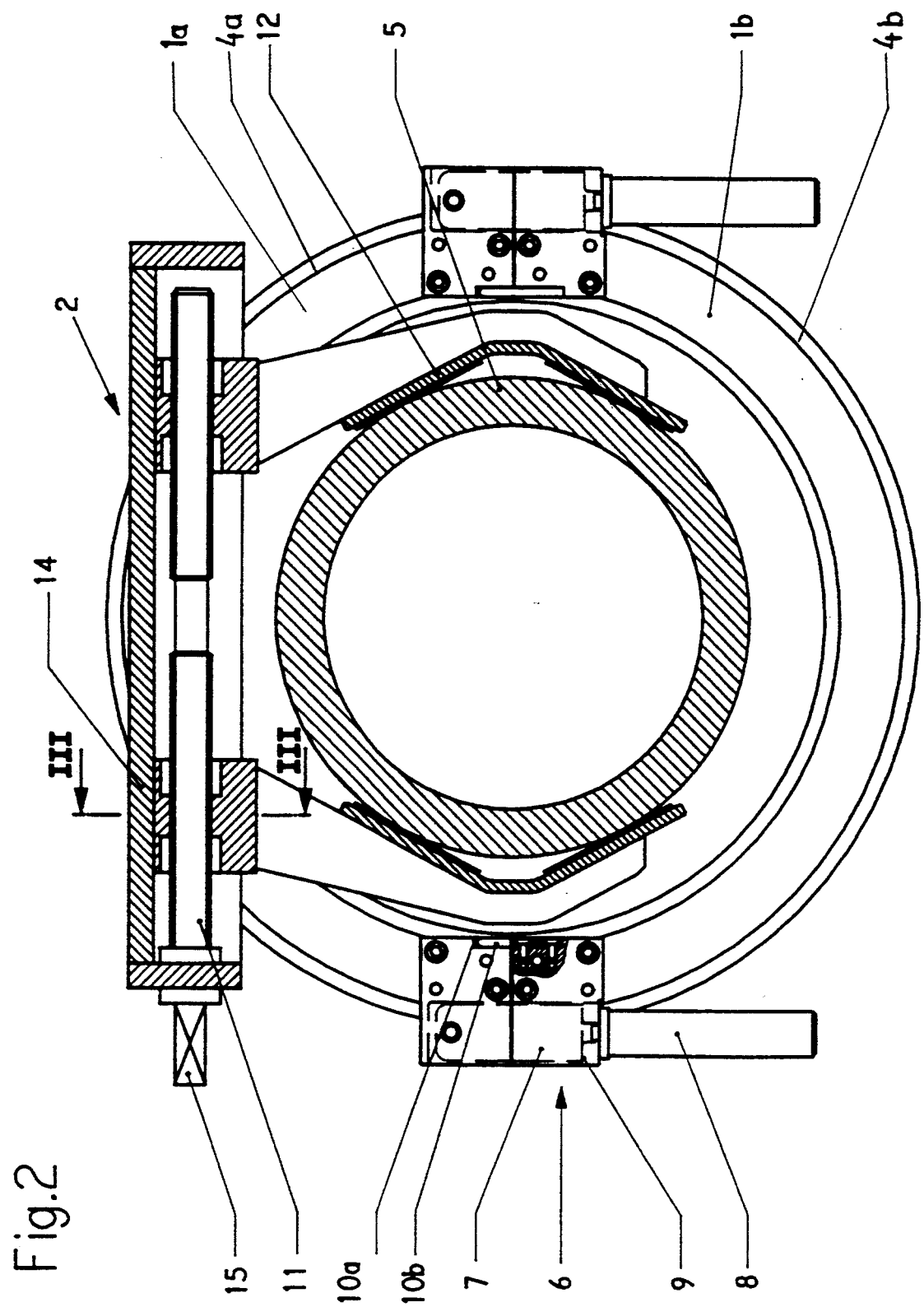
FIG. 2 is a cross-section along line II—II in FIG. 1, without the cutting device of the pipe cutoff apparatus.

Referring now to the figures, wherein numerals depict like elements throughout the several views, in FIG. 1 depicts a side view of a pipe severing or cutoff apparatus 2 comprising frame 1 having guide 4, pipe clamping device 2 (see FIG. 2) and cutting device 3 which is movable around the circumference of the pipe 5 to be cut.

The frame 1 comprises two frame parts 1a and 1b (see FIGS. 2, 4) configured as semicircularly-shaped rings having, at one end face, semicircular, angularly shaped guide parts 4a, 4b which are also semicircular and which together comprise the circular ring-shaped guide 4 when clamped to each other by rapid clamping devices 6.

Each rapid or quick clamping device 6 comprises a clamping screw element 7 with handle 8, pivotally fastened at frame part 1a. The clamping screw element 7 and clamping part 9 facilities fastening of the clamping device 6 to the other frame part 1b by turning handle 8. A nose or lug 10b is arranged at one frame part 1b for engaging a recess 10a in the other frame part 1a in order to fix and align the two frame parts 1a, 1b with respect to each other.

Figure 3:
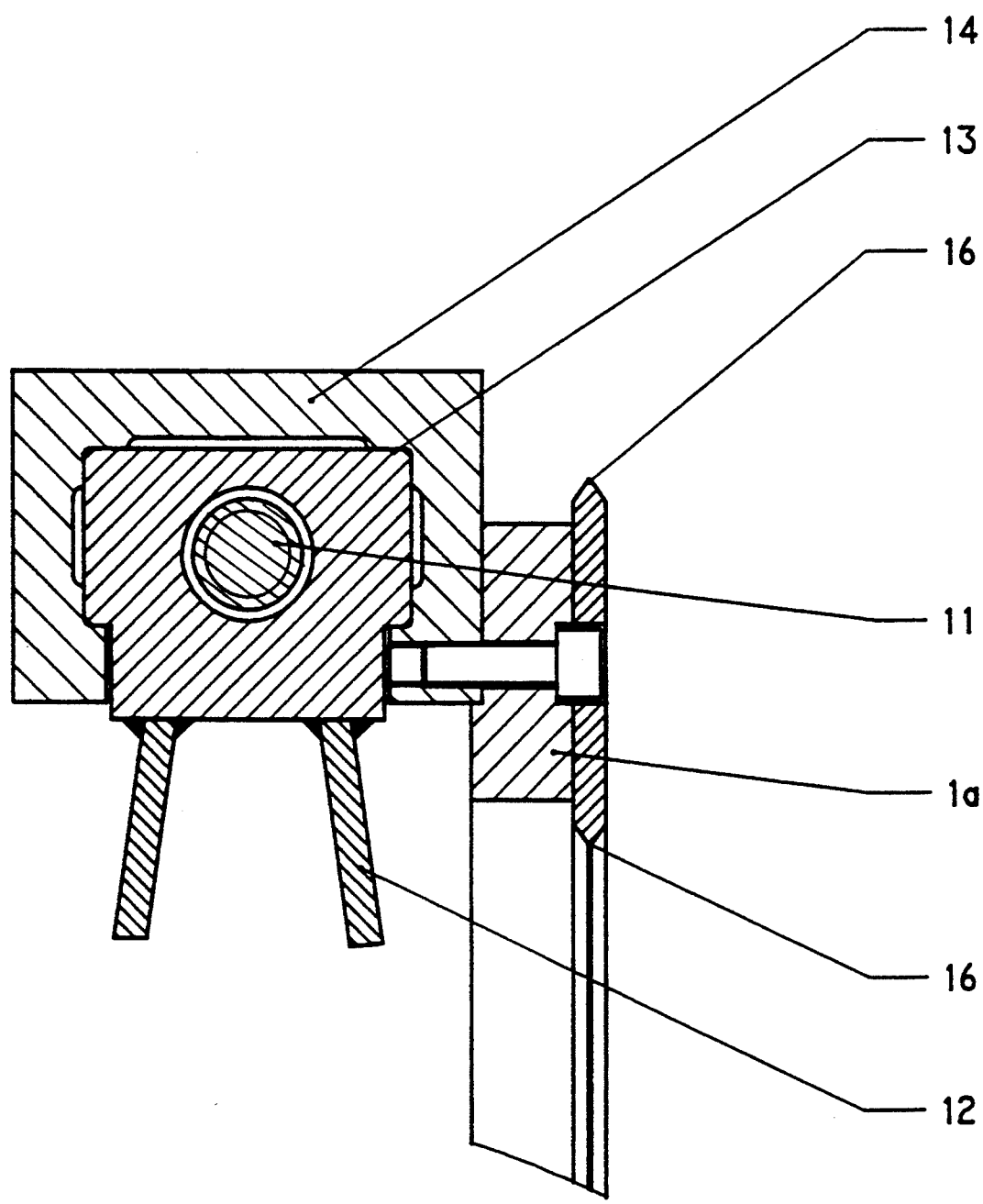
FIG. 3 is an enlarged partial cross-sectional view along view line III—III of FIG. 2.

Pipe clamping apparatus 2 is arranged at one frame part 1a and comprises clamping jaws 12 displaceable in opposite directions by threaded spindle 11. Clamping jaws 12 are designed to be V-shaped and assure a centered mounting of pipe 5 with respect to frame 1. Clamping jaws 12 are designed to be guided displaceably in a straight line in a prismatic guide 13 of a guide U-shaped guide box 14 (see FIG. 3). The threaded spindle 11 is axially held at one end of guide box 14 and is supported so as to be rotatable and comprises a polygonal member 15 for removing the clamping jaws 12. The guide box 14 is fastened at the end face of the frame part 1a, lying opposite the guide 4.

The guide 4 for the cutting device 3 comprises a V-shaped guide track 16 configured at its external and internal peripheries. Two rollers 17 with V-shaped guide grooves 18 are secured to a bearing block 19 and engage the inner and outer guide tracks 16. An adjustment arrangement 20 having a straight line guide 21 and a spindle drive 22, is also secured at the bearing block 19. A cutting tool bit 24, located on a sliding carriage 23, can be adjusted in radial direction with respect to the pipe 5. The cutting tool bit 24 is preferably a motor-driven circular saw 25, powered by electric drive 27 equipped with an angular drive 26 fastened to the carriage 23 and is configured as a handle 28 for the movement of the cutter tool bit along the guide 4 around the pipe 5. The cutter tool bit 24 can also be a cutter knife and/or a chamfering tool bit.

It is advantageous to employ at the bearing block 19 or at the rollers 17 an additional blocking device (not shown) for the circumferential movement in only one direction so that the circumferential feed motion during the severance process can occur only in the cutting direction preset by the cutting tool bit 24.

The cutting device 3 can be blocked by means of a lock bolt 29 at guide 4 in one or several circumferential positions. A tightening device (not shown in detail) can be used to tighten the cutting device 3 at the guide 4 in any circumferential position.

Figure 4:
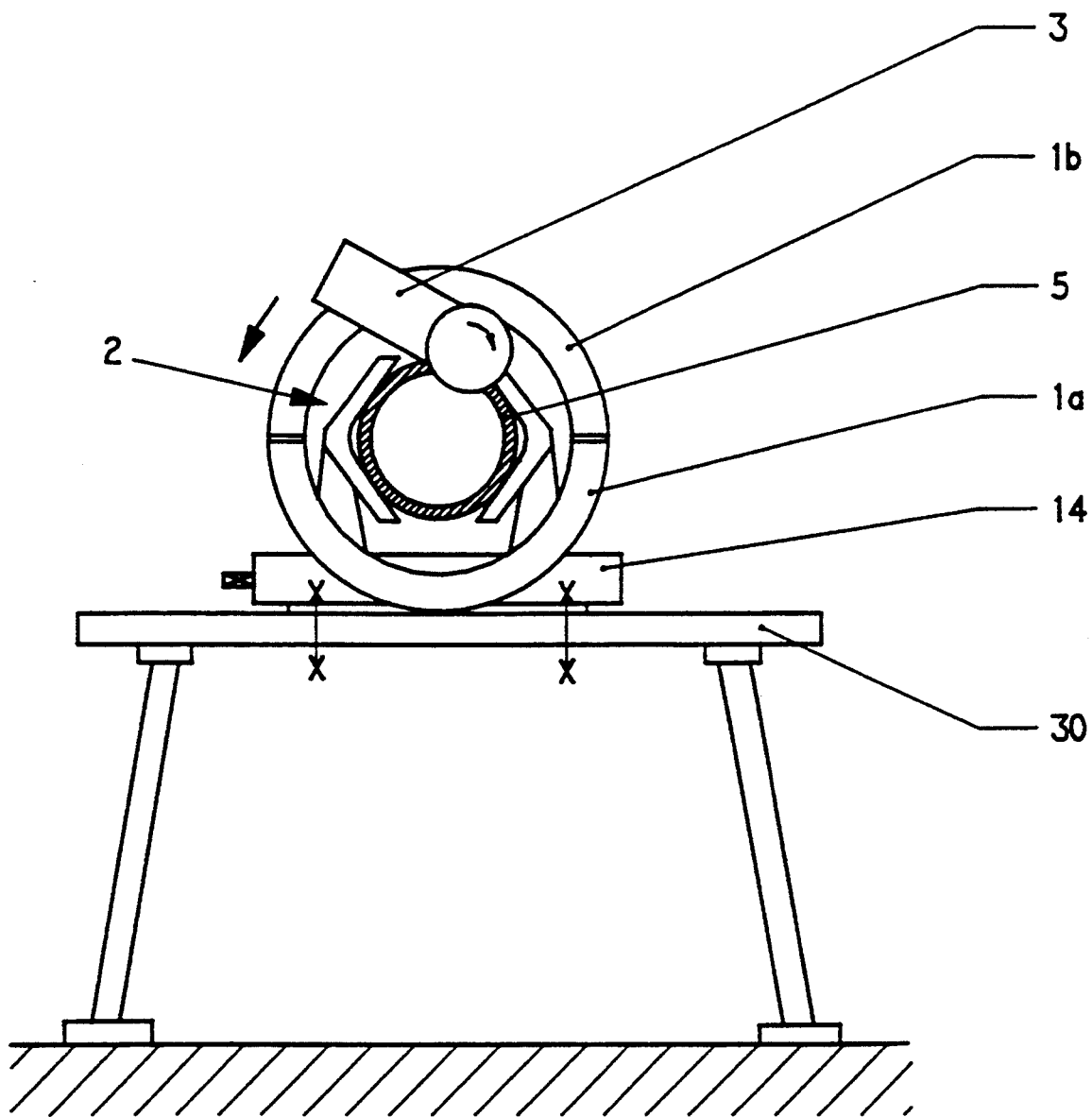
FIG. 4 is a simplified illustration of the stationary pipe cutoff apparatus.

The pipe cutoff apparatus may be used as a portable device at the site of laying the pipe, as well as a stationary tool, fastened, for example, to a workbench 30 (see FIG. 4). Here, the frame part 1a with a guide box is fastened either directly to the workbench 30 or the pipe 5 to be cut may be inserted from the top into a vice and held in a centered position by the pipe clamping device 2. After positioning the frame part 1b into place, the cutting by the cutting device 3 can follow. Shorter pipes can be axially introduced into the pipe clamping device 2.

If the pipes are already laid in trenches, the frame part 1a may be positioned from the top upon the pipe and can be centered by the pipe clamping arrangement. After turning the frame part 1a through 180°, the second frame part 1b can be positioned and clamped to the first frame part 1a whereupon the cutoff or severance process can be performed.

Depending on the available space, the pipe cutoff apparatus can be placed in any desired circumferential position upon the pipe.

While the invention and particularly the preferred embodiment thereof has been described in detail, adaptations and modifications thereof may be made without departing from the spirit and scope of the invention as defined in the following claims.

What is claimed is:

1. An apparatus for cutting a pipe, comprising:
   a frame having first and second separable segments for surrounding the pipe during cutting;
   guides secured to said frame for supporting a cutter movable around the pipe; and
   a clamping device supported on the first segment for centrally securing the pipe with respect to said apparatus during cutting, wherein the clamping device includes:
   two jaws for clamping the pipe;
   a guide box secured on the first segment and having a straight line guide for supporting the two clamping jaws for linear displacement relative to each other; and
   a threaded spindle for displacing the clamping jaws toward and away from each other.

2. The apparatus of claim 1, wherein said clamping jaws are V-shaped for a centered mounting of the pipe with respect to the frame.

3. The apparatus of claim 1, wherein said frame segments further comprise semicircularly-shaped rings, wherein said segments may be clamped together by two of elements devices.

4. The device of claim 3, wherein said clamping element further comprises a clamping screw element equipped with a handle and pivotally fastened to the first frame segment.

5. The apparatus as in claim 1, wherein said guides comprise semicircular angularly-shaped guide parts arranged at one end face at the frame segments, wherein said segments comprise a V-shaped guide track at an outer circumference and at an inner circumference.

6. The apparatus of claim 1, further comprising pipe rollers, wherein said cutter device is movable around said pipe and said rollers travel on outer and inner guide tracks at the frame.

7. The apparatus of claim 1, wherein said said cutter comprises a circular saw drivable by a motor and is displaceable radially to the pipe by an adjustment means.

8. The apparatus of claim 1, wherein said apparatus is usable as a portable tool for application upon the pipe to be severed at the site of laying of the pipe.

9. The apparatus of claim 1, wherein said apparatus is usable as a stationary tool.

10. The apparatus of claim 1, wherein said first frame segment equipped with the pipe clamping device can be fastened to a workbench and the pipe to be severed can be placed into the first frame segment and can be tightly clamped by the pipe clamping device prior to positioning the second segment.

* * * * *